(12) United States Patent
Manni et al.

(10) Patent No.: US 12,717,562 B2
(45) Date of Patent: Aug. 25, 2026

(54) COMPUTER-IMPLEMENTED METHOD FOR AUTOMATICALLY DETERMINING A TARGET ARCHITECTURE

(71) Applicant: Centre National d'Études Spatiales, Paris (FR)

(72) Inventors: Florent Manni, Toulouse (FR); Clément Coggiola, Toulouse (FR); Julien Galizzi, Montgiscard (FR)

(73) Assignee: Centre National d'Études Spatiales, Paris (FR)

( * ) Notice: Subject to any disclaimer, the term of this patent is extended or adjusted under 35 U.S.C. 154(b) by 255 days.

(21) Appl. No.: 18/501,224

(22) Filed: Nov. 3, 2023

(65) Prior Publication Data

US 2024/0061664 A1 Feb. 22, 2024

Related U.S. Application Data

(63) Continuation of application No. PCT/FR2022/050776, filed on Apr. 25, 2022.

(30) Foreign Application Priority Data

May 5, 2021 (FR) ..................................... 21/04755

(51) Int. Cl.
*G06F 8/41* (2018.01)

(52) U.S. Cl.
CPC .............. *G06F 8/447* (2013.01); *G06F 8/443* (2013.01)

(58) Field of Classification Search
None
See application file for complete search history.

(56) References Cited

U.S. PATENT DOCUMENTS 7,000,227 B1 * 2/2006 Henry ..................... G06F 8/443 717/146
7,386,844 B2 * 6/2008 Heishi ................... G06F 8/4432 713/320
7,926,046 B2 * 4/2011 Halambi .............. G06F 8/4452 717/149
9,182,957 B2 * 11/2015 Craymer ................ G06F 8/452
(Continued)

FOREIGN PATENT DOCUMENTS

WO 2015140021 9/2015

OTHER PUBLICATIONS

International Search Report issued in corresponding International Application PCT/FR2022/050776, mailed Oct. 5, 2022.
(Continued)

*Primary Examiner* — Francisco J Aponte
(74) *Attorney, Agent, or Firm* — Burris Law, PLLC

(57) ABSTRACT

A computer-implemented method for automatically determining a target architecture from a set of target architectures in order to implement an algorithm. The method includes selecting a language associated with a compiler of the language to produce a source code for the algorithm, the compiler including at least one compilation optimization option. Compiling source code for the algorithm according to at least one compilation optimization option to produce an object code. The method includes measuring at least one performance score of the produced object code, the at least one performance score being measured according to a metric.

12 Claims, 1 Drawing Sheet

(56) References Cited

U.S. PATENT DOCUMENTS

| | | | | |
|---|---|---|---|---|
| 9,372,678 | B2 * | 6/2016 | Bikshandi | G06F 8/443 |
| 9,823,911 | B2 * | 11/2017 | Chiba | G06F 8/40 |
| 10,242,419 | B2 * | 3/2019 | Sathe | G06T 1/60 |
| 10,956,137 | B2 * | 3/2021 | Waltenberg | G06F 8/71 |
| 11,269,605 | B1 * | 3/2022 | Nandanuru | G06F 8/51 |
| 11,347,490 | B1 * | 5/2022 | Drepper | G06N 20/00 |
| 11,494,681 | B1 * | 11/2022 | Peterson | G06F 15/16 |
| 11,733,981 | B2 * | 8/2023 | Venkat | G06F 16/2255<br>717/151 |
| 11,847,435 | B2 * | 12/2023 | Tsang | G06F 8/443 |
| 12,204,879 | B2 * | 1/2025 | Shi | G06F 8/41 |
| 2016/0110171 | A1 * | 4/2016 | Bikshandi | G06F 7/556<br>717/160 |
| 2019/0317880 | A1 * | 10/2019 | Herr | G06N 3/0985 |
| 2019/0377559 | A1 * | 12/2019 | Strosaker | G06F 8/427 |
| 2020/0104106 | A1 * | 4/2020 | Wang | G06F 9/5066 |
| 2020/0293295 | A1 * | 9/2020 | Gao | G06F 11/3457 |
| 2021/0004213 | A1 * | 1/2021 | Eltantawy | G06F 8/454 |
| 2021/0103434 | A1 * | 4/2021 | Venkat | G06F 16/2255 |
| 2022/0121430 | A1 * | 4/2022 | Venkat | G06F 8/443 |
| 2024/0134666 | A1 * | 4/2024 | Jaeger | G06F 12/1475 |

OTHER PUBLICATIONS

Jayakumar, et al., Matching Application Signatures for Performance Predictions using a Single Execution, 2015, IEEE 29th International Parallel and Distributed Processing Symposium, pp. 1161-1170, IEEE Computer Society.

Salaria, et al., Predicting Performance Using Collaborative Filtering, 2018 IEEE International Conference on Cluster Computing, pp. 504-514, IEEE Computer Society.

* cited by examiner

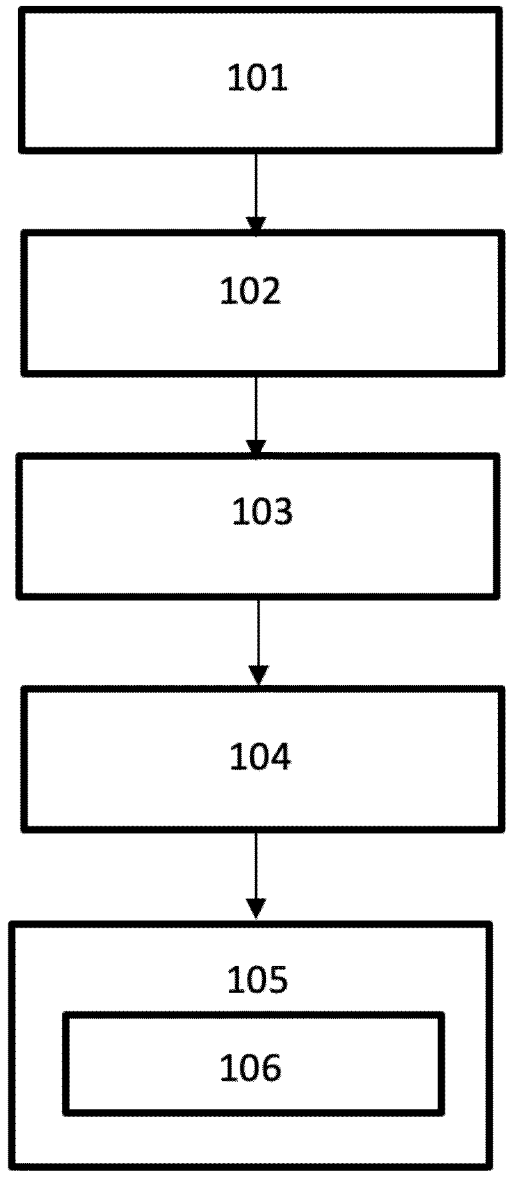
101
102
103
104
105
106
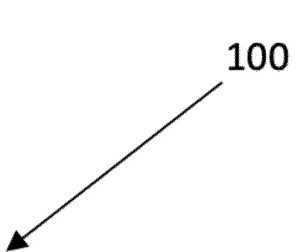
100

COMPUTER-IMPLEMENTED METHOD FOR AUTOMATICALLY DETERMINING A TARGET ARCHITECTURE

CROSS-REFERENCE TO RELATED APPLICATIONS

This application is a continuation of International Application No. PCT/FR2022/050776, filed on Apr. 25, 2022, which claims priority to and the benefit of FR 21/04755 filed on May 5, 2021. The disclosures of the above applications are incorporated herein by reference.

FIELD

The present disclosure relates to hardware architectures for the implementation of an algorithm.

BACKGROUND

The statements in this section merely provide background information related to the present disclosure and may not constitute prior art.

Today, the algorithms to be embedded are increasingly complex. Generally, these algorithms are coded in a software language that is not intended to be embedded or include non-embedded functions. Furthermore, hardware targets are varied, such as CPU, FPGA, Systems-On-Chip, Many-Cores, GPU, Ai-Engine, etc., and each hardware target has advantages and disadvantages. When these algorithms are embedded, it is desired to find which hardware target is best suited to the most efficient implementation with regard to the constraints, whether in terms of execution speed, consumption, need for computing resources, etc., and with regard to the needs of the project. It is known to determine empirically, i.e. through experimentation, the hardware architecture adapted to the most efficient implementation of an algorithm, where applicable, by simulating or carrying the algorithm, and by experimentally evaluating the performance of the implementation on several architectures, successively, of the algorithm previously adapted/optimized for each considered hardware architecture. This approach, generally called Dynamic Program Analysis, is tedious and expensive.

SUMMARY

This section provides a general summary of the disclosure and is not a comprehensive disclosure of its full scope or all of its features.

The present disclosure provides a method to determine the most suitable target architecture for the algorithm, upstream of any simulation or any implementation specific to the target.

The present disclosure concerns a computer-implemented method for automatically determining a target architecture among a set of target architectures to implement an algorithm, the method comprising the following steps: selecting a language to produce a source code of the algorithm, the language being associated with a compiler of the language, the compiler comprising at least one compilation optimization option; compiling the source code of the algorithm according to the at least one compilation optimization option to produce an object code; measuring at least one performance score of the produced object code, the at least one performance score being measured according to a metric; determining the target architecture based on the application of an affinity function between the algorithm and a reference algorithm associated with the target architecture, the application of the affinity function comprising a calculation of an affinity from the at least one performance score of the object code produced by the at least one compilation optimization option and from at least one reference score of a reference object code produced by compiling a reference source code produced for the reference algorithm in the selected language.

According to these provisions, the method determines the most suitable target architecture for the algorithm, upstream of any simulation or implementation, from any computer language, on the assumption that the associated compiler has at least one compilation optimization option. Thus, the designer of the algorithm can quickly adapt his algorithm for a determined target architecture, and/or be concentrated on the improved implementation of his algorithm on the determined target architecture.

According to a form, the present disclosure comprises one or more of the following characteristics, alone or in technically acceptable combination. According to an implementation mode, the compiler comprises a plurality of compilation optimization options, each compilation optimization option applied to the source code of the algorithm producing an object code among a plurality of object codes of the algorithm. According to an implementation mode, for each compilation optimization option, the at least one performance score of the produced object code is measured according to one metric among a plurality of metrics, so that a plurality of performance scores are measured for the object code produced with the compilation optimization option, each performance score being associated with one among the plurality of metrics.

According to an implementation mode, the plurality of performance scores of the different object codes of the algorithm, each measured according to a metric among the plurality of metrics for a compilation optimization option among the plurality of compilation optimization options, forms a matrix of performance scores, each element of the matrix being a performance score associated with a binomial comprising an object code produced according to a compilation optimization option among the plurality of options and a metric among the plurality of metrics. According to an implementation mode, the matrix comprises a row of performance scores for each compilation optimization option and a column of performance scores for each metric.

According to an implementation mode, the set of target architectures comprises at least one architecture of the CPU, FPGA, Systems-On-Chip, Many-Cores, GPU, Ai-Engine, System-On-Chip, Network-On-Chip, ASIC type.

According to an implementation mode, the selected language can be one of the following set: C, Java, Python, Matlab, VHDL, Verilog, SystemC, C++, SystemVerilog, Scala, etc.

According to an implementation mode, the plurality of metrics for measuring the at least one performance score of the implementation of the object code comprises at least one among the following plurality of metrics:

- a number of instructions,
- a number of memory accesses,
- a number of subfunction calls,
- a cyclomatic complexity,
- a Halstead complexity,
- an essential complexity,
- a branching complexity, also called Sneed Metric,
- a data access complexity, also called Card Metric,
- a data complexity, also called Chapin Metric,

- a complexity of data flows, also called Elshof Metric,
- a decision complexity, also called McClure Metric,
- a Chidamber and Kemerer metric,
- a software module metric, and
- weighted micro-function points.

The performance score being measured on the object code produced by the compilation optimization option.

According to an implementation mode, the application of the affinity function comprises a calculation of an affinity between the algorithm and each reference algorithm among a plurality of reference algorithms, and in which the step of determining the target architecture comprises a selection of a reference algorithm according to a criterion based on the affinity. According to an implementation mode, the criterion is based on an optimum, for example a maximum or a minimum, of the affinity. According to an implementation mode, the affinity is calculated, for each reference algorithm among the plurality of reference algorithms, from a plurality of reference scores of the reference object code produced for each compilation optimization option of the reference algorithm, each reference score being measured according to one metric among the plurality of metrics. According to a form, for each reference algorithm among the plurality of reference algorithms, the plurality of reference scores of the reference algorithm, measured according to the plurality of metrics for the plurality of compilation optimization options, forms a reference matrix of reference scores, each element of the reference matrix being a reference score associated with a binomial comprising a reference object code produced according to a compilation optimization option among the plurality of options and one metric among the plurality of metrics. According to an implementation mode, the reference matrix comprises a row of reference scores for each compilation optimization option and a column of reference scores for each metric. According to a variation, the affinity function is a correlation of the matrix of performance scores of the algorithm with the reference matrix of reference scores of the reference algorithm. According to a form, the affinity function is a distance of the matrix of performance scores of the algorithm with the reference matrix of reference scores of the reference algorithm, the distance being calculated, according to one of the functions among the cosine similarity function, the Jaccard similarity function, the Manhattan distance function, the Euclidean distance function, the Minkowski distance function.

For its proper understanding, a form and/or implementation mode of the present disclosure is described with reference to the attached drawings representing, by way of non-limiting example, a form or implementation mode respectively of a device and/or a method according to the present disclosure. The same references in the drawings designate similar elements or elements with similar functions.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a schematic representation of the sequencing of the steps according to an implementation mode of the method according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

An implementation mode of the method 100 according to the present disclosure will be described with reference to FIG. 1.

A compiler translates an algorithm, described by a source code in a computer language, into a computer object, called object code. The computer language can be, for example: C, java, python, Matlab, VHDL, Verilog, SystemC, C++, SystemVerilog, Scala. In the context of the present disclosure, the compilation is understood in the broad sense, i.e. both software and hardware, so that the object code comprises instructions in machine language and hardware architecture components. The hardware architectures are, for example, of the CPU, FPGA, Systems-On-Chip, Many-Cores, GPU, Ai-Engine, System-On-Chip, Network-On-Chip, ASIC type.

The compiler integrates optimization options, each optimization option enables the best adjustment of the object code to different constraints, such as execution speed, memory usage, etc.

A metric is a function which, from an analysis of the object code, determines a characteristic, which will be called performance score, of the object code, such as a size of the used memory, a number of used instructions, a type of multipliers. For each optimization option, a performance score of the object code produced with that optimization option can be calculated according to different metrics.

The different metrics used to measure performance scores of the object code are for example:

- a number of instructions,
- a number of memory accesses,
- a number of subfunction calls,
- a cyclomatic complexity,
- a Halstead complexity,
- an essential complexity,
- a branching complexity, also called Sneed Metric,
- a data access complexity, also called Card Metric,
- a data complexity, also called Chapin Metric or,
- a data flow complexity, also called Elshof Metric,
- a decision complexity, also called McClure Metric,
- a Chidamber and Kemerer metric,
- a software module metric, and
- weighted micro-function points.

The plurality of performance scores of the algorithm, each measured according to one metric among the plurality of metrics for one compilation optimization option among the plurality of compilation optimization options, forms a performance score matrix, each element of the matrix being a performance score associated with a binomial comprising a compiler optimization option among the plurality of options and a metric among the plurality of metrics.

A reference algorithm is also identified as being more efficient than others when the reference algorithm is compiled, according to the different compilation options, into an object code implemented on a given target architecture. The target architecture is thus associated with the reference algorithm, the object codes of which are deemed to be more efficient than those of other algorithms, when executed on the target architecture. Each target architecture comprises hardware components and software components.

For each reference algorithm, associated with a target architecture, a reference score is calculated, according to the different considered metrics, for the object code obtained with each compiler optimization option applied to a reference source code of the reference algorithm; a reference matrix is thus formed for the target architecture, each element of the matrix being a reference score associated with a binomial comprising a compiler optimization option among a plurality of options and a metric among a plurality of metrics.

For a given new algorithm, an affinity function is applied between the algorithm and a reference algorithm, the application of the affinity function comprising a calculation of an affinity from the performance score(s) of each object code of the algorithm, produced by each compilation optimization option, and from the reference score(s) associated respectively with the reference object code(s) each produced by compiling a reference source code produced for the reference algorithm, the reference algorithm being associated with the target architecture.

The affinity between a given algorithm and a reference algorithm is thus an indicator of similarity of the performance score matrix of the given algorithm and of the reference score matrix of the reference algorithm for a given target architecture.

The method 100 according to the present disclosure is implemented by a computer and aims to automatically determine a target architecture among a set of target architectures, the target architecture being adapted to implement a given algorithm.

The method 100 comprises the following steps: selecting 101 a language to produce a source code of the algorithm, the language being associated with a compiler of the language, the compiler comprising one or more compilation optimization option(s); compiling 102 the source code of the algorithm according to the compilation optimization option(s) to produce one or more object code(s); measuring 103 one or more performance score(s) for the or for each produced object code, each performance score being measured according to a metric; determining 105 the target architecture after applying an affinity function by calculating 104 an affinity from the performance score(s) of each object code produced by each compilation optimization option, and from one or more reference score(s) associated respectively with one or more reference object code(s) each produced by compiling a reference source code produced for a reference algorithm in the selected language. The reference algorithm being associated with the target architecture.

According to these provisions, the method determines the most suitable target architecture for the given algorithm, upstream of any simulation or implementation mode, from any computer language, on the assumption that the associated compiler has at least one compilation optimization option. Thus, to determine the most suitable target architecture, the application of the affinity function comprises, for example, the calculation 104 of an affinity between the given algorithm and each reference algorithm among a plurality of reference algorithms, and the most suitable target architecture is determined by the selection 106 of a reference algorithm according to a criterion based on the application of the affinity function. More particularly, the criterion is based on an optimum, for example a maximum or a minimum, of the affinity calculated for the different reference algorithms. Thus, the designer of the algorithm can quickly adapt the algorithm for a determined target architecture, and/or concentrate on the improved implementation of the algorithm on the determined target architecture.

For example, the affinity function is a correlation of the performance score matrix of the given algorithm with the reference matrix of reference scores of the reference algorithm. The affinity function is a distance of the performance score matrix of the algorithm with the reference score matrix of the reference algorithm; for example, the distance is calculated, according to the cosine similarity function, or the Jaccard similarity function, or the Manhattan distance function, or the Euclidean distance function, or even the Minkowski distance function.

Unless otherwise expressly indicated herein, all numerical values indicating mechanical/thermal properties, compositional percentages, dimensions and/or tolerances, or other characteristics are to be understood as modified by the word “about” or “approximately” in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean “at least one of A, at least one of B, and at least one of C.”

In this application, the term “controller” and/or “module” may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A computer-implemented method for automatically determining a target architecture among a set of target architectures for implementing an algorithm, the method comprising:

selecting a language to produce a source code of the algorithm, the language being associated with a compiler of the language, the compiler comprising at least one compilation optimization option;

compiling the source code of the algorithm according to the at least one compilation optimization option to produce an object code;

measuring at least one performance score of the produced object code, the at least one performance score being measured according to a metric; and determining the target architecture based on an application of an affinity function between the algorithm and a reference algorithm associated with the target architecture, the application of the affinity function comprising a calculation based on the at least one performance score of the object code produced by the at least one compilation optimization option and on at least one reference score of a reference object code produced by compiling a produced reference source code for the reference algorithm in the selected language.

2. The method according to claim 1, wherein the at least one compilation optimization option comprises a plurality of compilation optimization options, wherein the method further comprises applying each of the plurality of compilation optimization options to the source code of the algorithm to produce a respective object code among a plurality of object codes of the algorithm.

3. The method according to claim 2, further comprising measuring, for each of the plurality of compilation optimization options and for each of a plurality of metrics, one of the at least one performance score of the respective object code according to said metric, said one of the at least one performance score being associated to the respective object code and said metric, so that a plurality of performance scores is measured.

4. The method according to claim 3, wherein the plurality of performance scores forms a matrix of performance scores.

5. The method according to claim 3, wherein the plurality of metrics comprises at least one among:

a number of instructions,
a number of memory accesses,
a number of subfunction calls,
a cyclomatic complexity,
a Halstead complexity,
an essential complexity,
a branching complexity,
a data access complexity,
a data complexity,
a complexity of data flows,
a decision complexity,
a Chidamber and Kemerer metric,
a software module metric, and
weighted micro-function points.

6. The method according to claim 1, wherein the application of the affinity function comprises a calculation of an affinity between the algorithm and each reference algorithm among a plurality of reference algorithms, and wherein the determining of the target architecture comprises selecting a reference algorithm according to a criterion.

7. The method according to claim 6, wherein the criterion is based on an optimum of the affinity.

8. The method according to claim 6, further comprising measuring, for each reference algorithm among the plurality of reference algorithms, for each of the plurality of compilation optimization options of each reference algorithm and for each of a plurality of metrics, one of the at least one reference score of a respective reference object code according to said metric, said one of the at least one reference score being associated to the respective reference object code and said metric, so that a plurality of reference scores is measured, and wherein the affinity is calculated, for each reference algorithm among the plurality of reference algorithms, from the plurality of reference scores.

9. The method according to claim 8, wherein for each reference algorithm among the plurality of reference algorithms, the plurality of reference scores forms a reference matrix of reference scores.

10. The method according to claim 9, wherein the affinity function is a correlation of a performance score matrix of the algorithm with the reference matrix.

11. The method according to claim 9, wherein the affinity function is a distance of the matrix of performance scores with the reference matrix.

12. The method according to claim 11, wherein the distance is calculated according to one of the functions among a cosine similarity function, a Jaccard similarity function, a Manhattan distance function, a Euclidean distance function, and a Minkowski distance function.

* * * * *